(12) United States Patent
Lin

(10) Patent No.: US 10,278,409 B1
(45) Date of Patent: May 7, 2019

(54) ROTATIONAL ICE CREAM HOLDER

(71) Applicant: Avery Yo-Chi Lin, Irvine, CA (US)

(72) Inventor: Avery Yo-Chi Lin, Irvine, CA (US)

( * ) Notice: Subject to any disclaimer, the term of this patent is extended or adjusted under 35 U.S.C. 154(b) by 0 days.

(21) Appl. No.: 16/024,740

(22) Filed: Jun. 30, 2018

(51) Int. Cl.
*A47F 5/00* (2006.01)
*A23G 9/50* (2006.01)

(52) U.S. Cl.
CPC .............. *A23G 9/503* (2013.01); *A23G 9/506* (2013.01)

(58) Field of Classification Search
CPC ........................................ A23G 9/503
USPC .................................. 294/137, 145, 165, 171
See application file for complete search history.

(56) References Cited

U.S. PATENT DOCUMENTS

| | | | | |
|---|---|---|---|---|
| 1,835,719 A * | 12/1931 | Parr | ........................... | A23G 9/50 426/134 |
| 2,321,519 A * | 6/1943 | Rubinoff | ................. | A23G 9/503 215/392 |
| 2,581,879 A * | 1/1952 | Powers, Jr. | .......... | G01B 5/0002 108/139 |
| 2,803,550 A * | 8/1957 | Ackalusky | ............... | A23G 9/26 426/134 |
| 2,948,452 A * | 8/1960 | Grogan | .................. | A23G 9/503 215/392 |
| 3,481,458 A * | 12/1969 | Mayeaux | ........... | B65D 83/0011 206/527 |
| 4,732,274 A * | 3/1988 | Bouton | ................ | A47G 19/065 206/1.7 |
| 4,828,163 A * | 5/1989 | Yu | .......................... | A23G 9/503 222/386 |
| 5,736,659 A | 4/1998 | Kyle, Jr. | | |
| 5,971,829 A | 10/1999 | Hartman | | |
| 6,032,825 A * | 3/2000 | Guthrie | .................. | A23G 4/062 141/340 |
| 6,941,982 B1 * | 9/2005 | Swan | ..................... | B65D 85/78 141/86 |
| 8,747,928 B2 | 6/2014 | Price et al. | | |
| 2006/0013930 A1 | 1/2006 | Anthony | | |

* cited by examiner

*Primary Examiner* — Paul T Chin
(74) *Attorney, Agent, or Firm* — J.H. Lin Patent Law P.C.; John H. Lin

(57) ABSTRACT

A rotational ice cream holder apparatus is provided. The rotational ice cream holder includes a dish that catches dripping ice cream. The dish has an opening or aperture for holding an ice cream cone. The dish can be rotated with respect to a handle such that a person using the rotational ice cream holder can enjoy different parts of the ice cream by simply using his hand to turn the dish.

11 Claims, 6 Drawing Sheets

ROTATIONAL ICE CREAM HOLDER

BACKGROUND

Technical Field

The present disclosure generally relates to a receptacle for holding ice cream or other types of melting food while it is being consumed.

Description of the Related Art

Ice cream continues to be widely enjoyed by children and adults alike around the world, especially in hot weather. One of the most popular ways of presenting ice cream for enjoyment is to pile scoops of ice cream in an edible wafer cone. The wafer cone makes it possible for a person to hold the ice cream in his or her hand while enjoying the ice cream. The wafer cone also lets the person manipulate and rotate the ice cream so he or she can enjoy all sides of the ice cream. Unfortunately, the ice cream melts rapidly in hot weather, often dripping over the wafer cone and onto the hand that holds the cone, making the ice cream experience somewhat less pleasant.

SUMMARY

Some embodiments of the disclosure provide a rotational ice cream holder apparatus. The rotational ice cream holder includes a plate or dish that catches dripping ice cream. The dish has an opening or aperture for receiving and holding an ice cream cone. The dish can be rotated with respect to a handle such that a person holding the rotational ice cream holder can enjoy different parts of the ice cream by simply using his hand to turn the dish. The dish has a surface area that is substantially larger than a scoop of ice cream. The ice cream holder also includes a rotator that is coupled to the dish, and the handle is coupled to the rotator. The rotator allows the dish to rotate about the handle.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide an inexpensive apparatus that allows a person to hold ice cream (or another type of melting food) in his or her hand and to enjoy the ice cream from all sides while preventing the ice cream from dripping onto the hand. The apparatus is a rotational ice cream holder that includes a plate or dish that catches dripping ice cream. The surface area of the dish is substantially larger than a scoop of ice cream. The dish has an opening or aperture for receiving and holding an ice cream cone. The dish can be rotated with respect to a handle such that a person using the rotational ice cream holder can enjoy different parts of the ice cream by simply using his hand to turn the dish. The ice cream holder includes a rotator that is coupled to the dish, as well as a handle that is coupled to the rotator. The rotator allows the dish to rotate about the handle.

Figure 1:
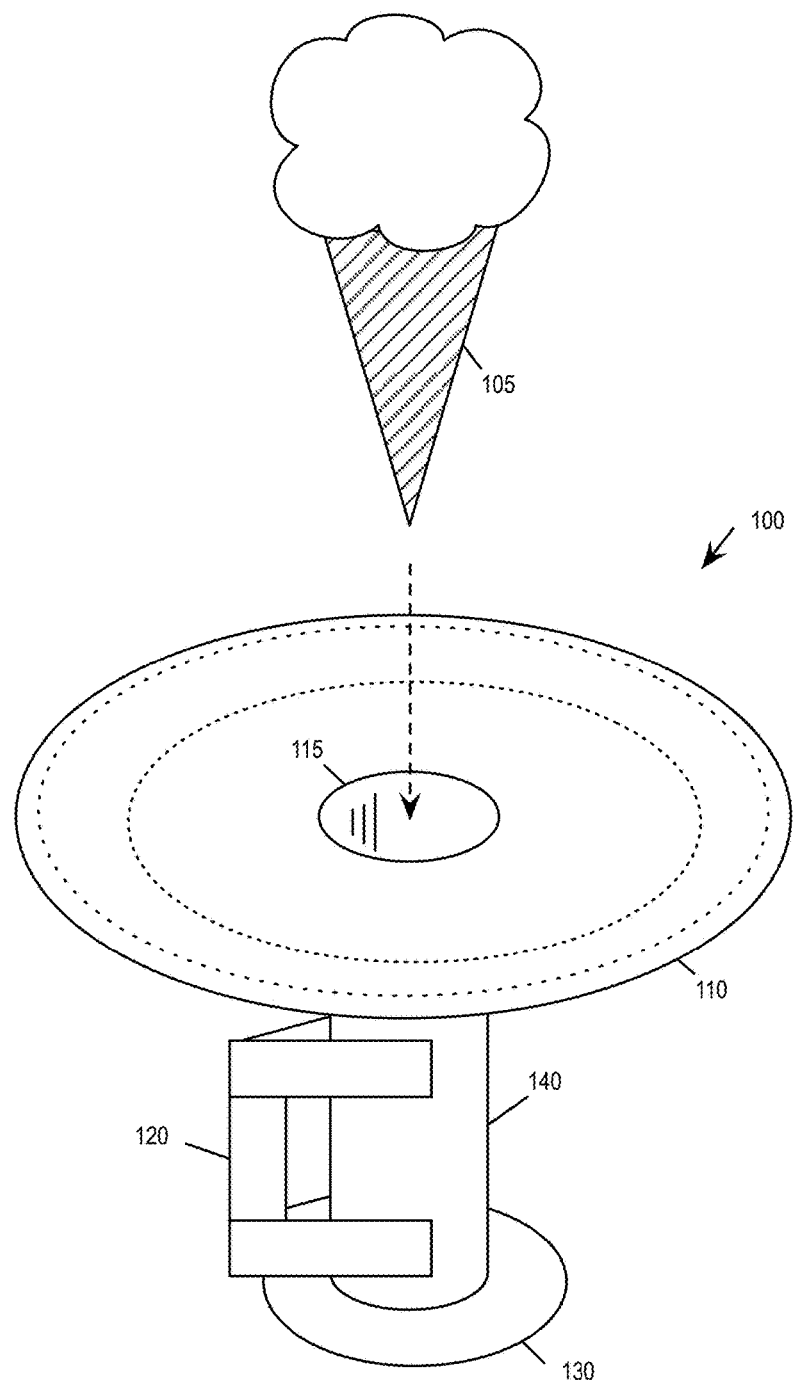
FIG. 1 illustrates a top perspective view of a rotational ice cream holder, consistent with an embodiment of the disclosure.

FIG. 1 illustrates a top perspective view of a rotational ice cream holder 100, consistent with an embodiment of the disclosure. The figure shows the rotational ice cream holder 100 being ready to receive an ice cream cone 105. As illustrated, the ice cream holder 100 includes a dish 110, a handle 120, a base 130, and a rotator 140.

The dish 110 has an aperture 115 for receiving and holding the ice cream cone 105. The diameter of the aperture 115 is smaller than the largest diameter of the ice cream cone 105 so the dish can hold the ice cream cone without the cone falling through the aperture. The diameter of the aperture 115 is also large enough to allow most of the ice cream cone to go through the aperture so the rotational ice cream holder can stably hold the ice cream cone. For example, in some embodiments, the diameter of the aperture 115 is around 85% of the diameter of the ice cream cone 105.

Figure 2:
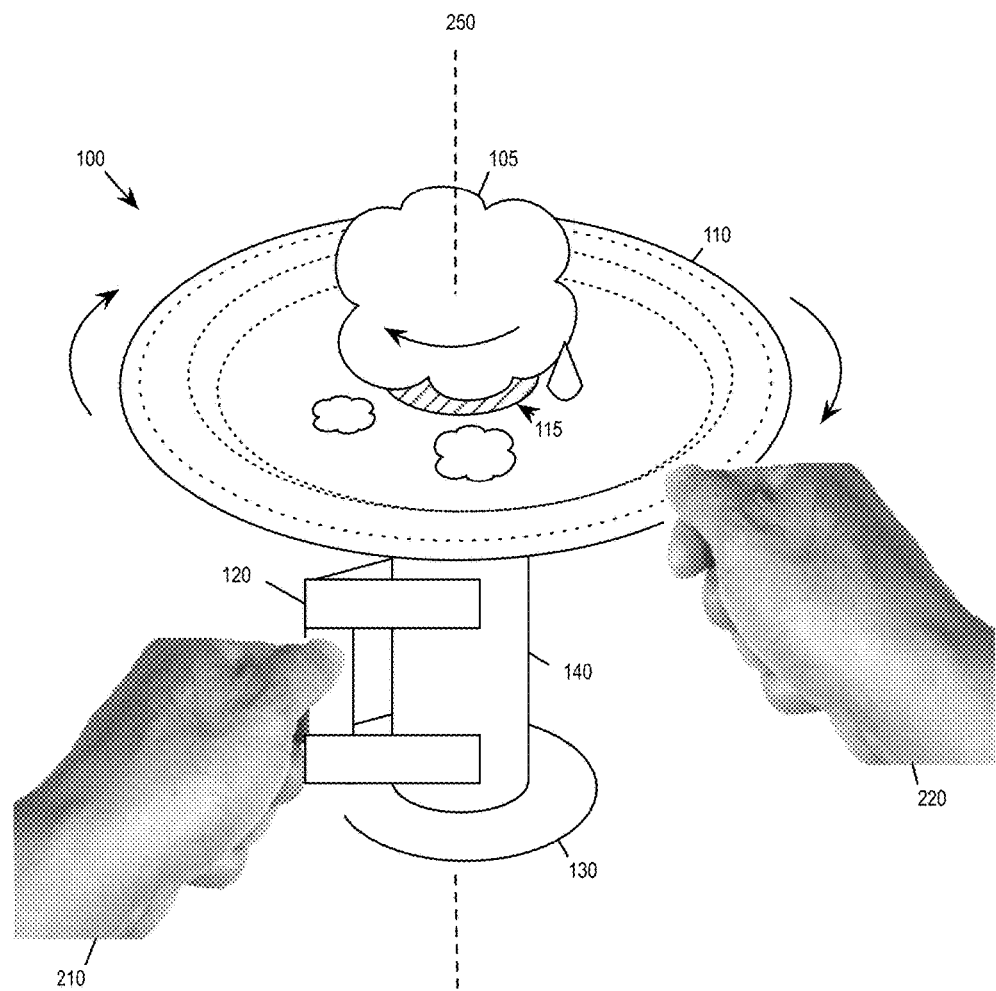
FIG. 2 illustrates the rotational ice cream holder holding an ice cream cone.

FIG. 2 illustrates the rotational ice cream holder holding the ice cream cone 105. A person (indicated by a left hand 210) may hold the rotational ice cream holder 100 at the handle 120 when enjoying the ice cream cone 105. The dish 110 is free to rotate about an axis 250 relative to the handle 120. A person enjoying the ice cream may therefore rotate the ice cream cone 105 by grabbing and rotating the dish 110 (indicated by a right hand 220). The surface area of the dish 110 is substantially larger than the diameter of the ice cream cone 105 (or the scoop of the ice cream) such that the melted ice cream dripping off the ice cream cone 105 would be caught by the dish 110 and not reach the person's hand.

Figure 3:
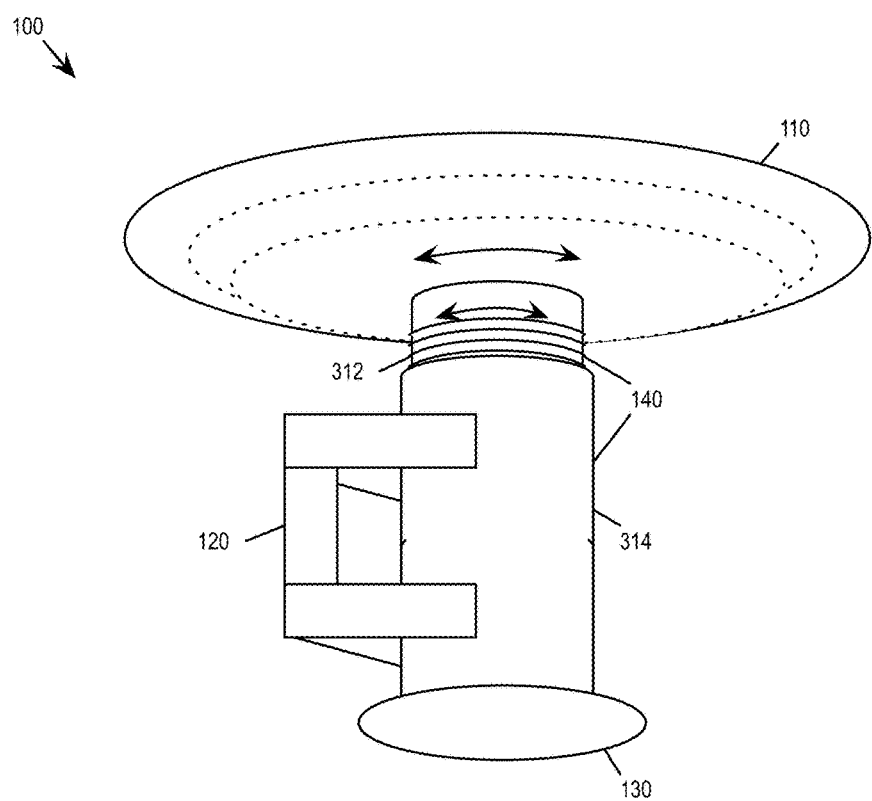
FIG. 3 illustrates a bottom perspective view of the rotational ice cream holder.

FIG. 3 illustrates a bottom perspective view of the rotational ice cream holder 100. As illustrated, the dish 110 is coupled to the handle 120 through the rotator 140. Specifically, the dish is 110 is affixed to the rotator 140 and the rotator 140 is coupled to the handle 120, thereby allowing the dish to rotate about the axis 250 relative to the handle 120. In some embodiments, the rotator 140 includes a moving component 312 and a stationary component 314 that are rotatably coupled. The dish 110 is affixed to the moving component 312 and handle 120 is affixed to the stationary component 314, thereby allowing the dish 110 to rotate about the axis 250 relative to the handle 120.

Figure 4:
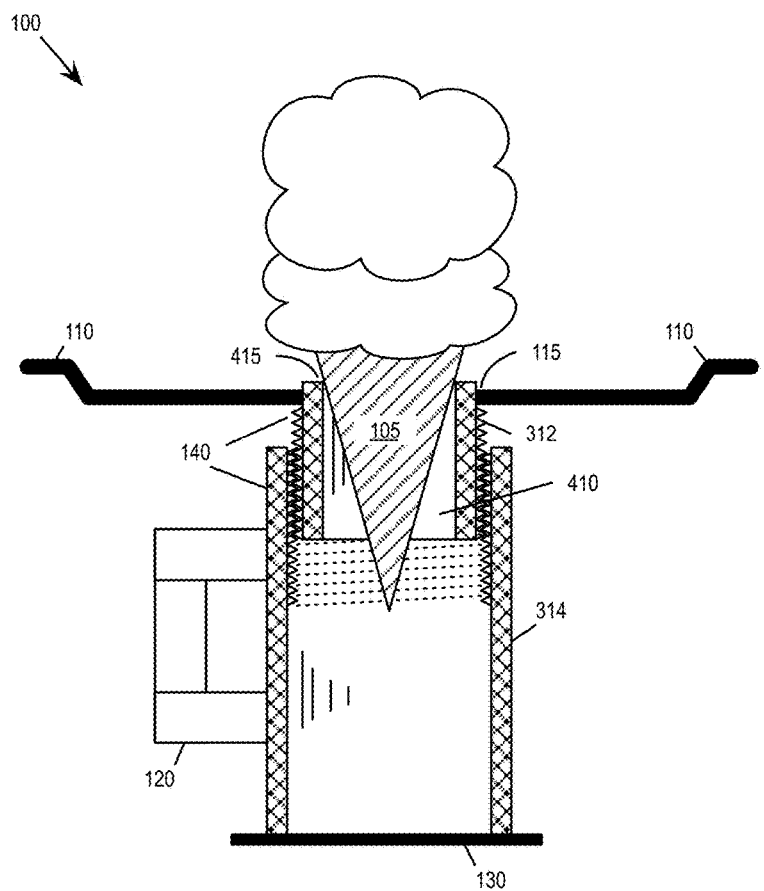
FIG. 4 illustrates a cross section view of the rotational ice cream holder.

FIG. 4 illustrates a cross section view of the rotational ice cream holder 100 (while holding the ice cream cone 105.) As illustrated, the rotator 140 (or the moving component 312 of the rotator 140) is affixed to the dish 110 at the aperture 115. The rotator 140 has a cavity 410, and the cavity has an opening 415 that is aligned with the aperture 115 of the dish 110 so that the ice cream cone rests at the walls of the cavity 410 when aperture 115 of the dish 110 receives and holds the ice cream cone 105.

Figure 5:
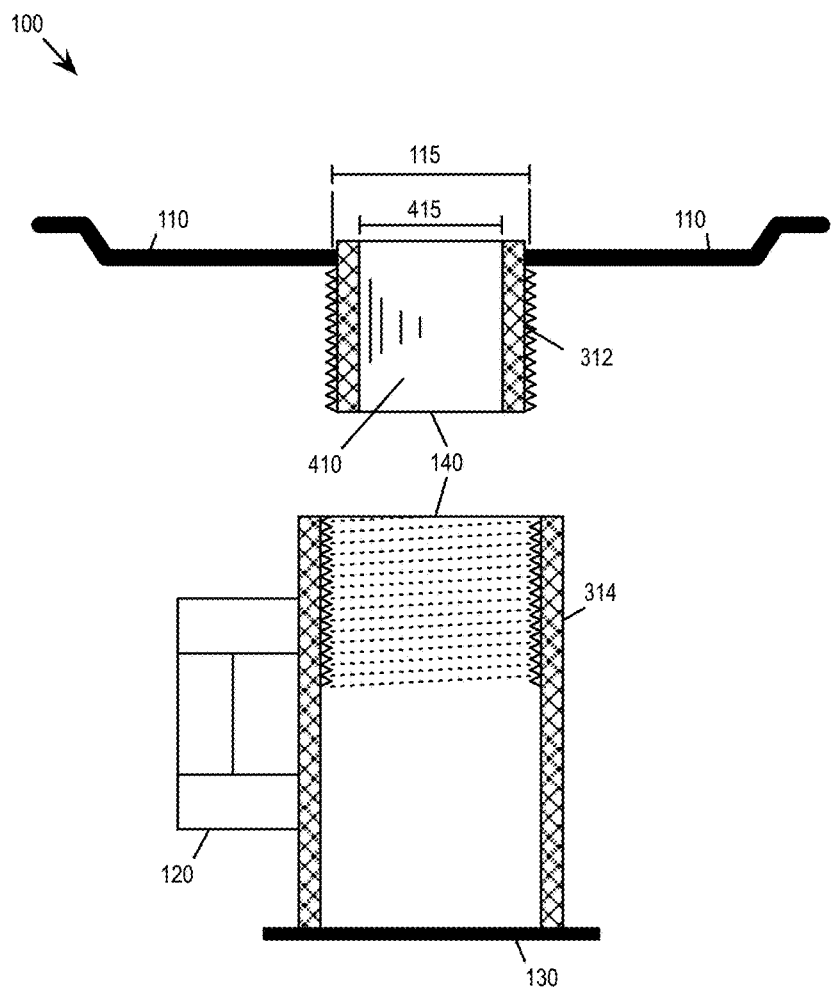
FIG. 5 illustrates a cross section view of the rotational ice cream holder when a moving component of the rotator is detached from a stationary component of the rotator.

The moving component 312 and the stationary component 314 of the rotator 140 are threaded with respect to each other. As illustrated in FIG. 4, the moving component is a threaded male component with threaded exterior and the stationary component is a threaded female component with threaded interior. The moving component 312 can be detached from or mated with the stationary component 314. FIG. 5 illustrates a cross section view of the rotational ice cream holder 100 when the moving component 312 of the rotator 140 is detached from the stationary component 314 of the rotator 140.

Having a threaded moving component and a threaded stationary component is one of several possible implementations of the rotator 140. For example, in some embodiments, the components of the rotator are not threaded. Instead, a moving component is held in place by a single groove in the walls of a stationary component.

Figure 6:
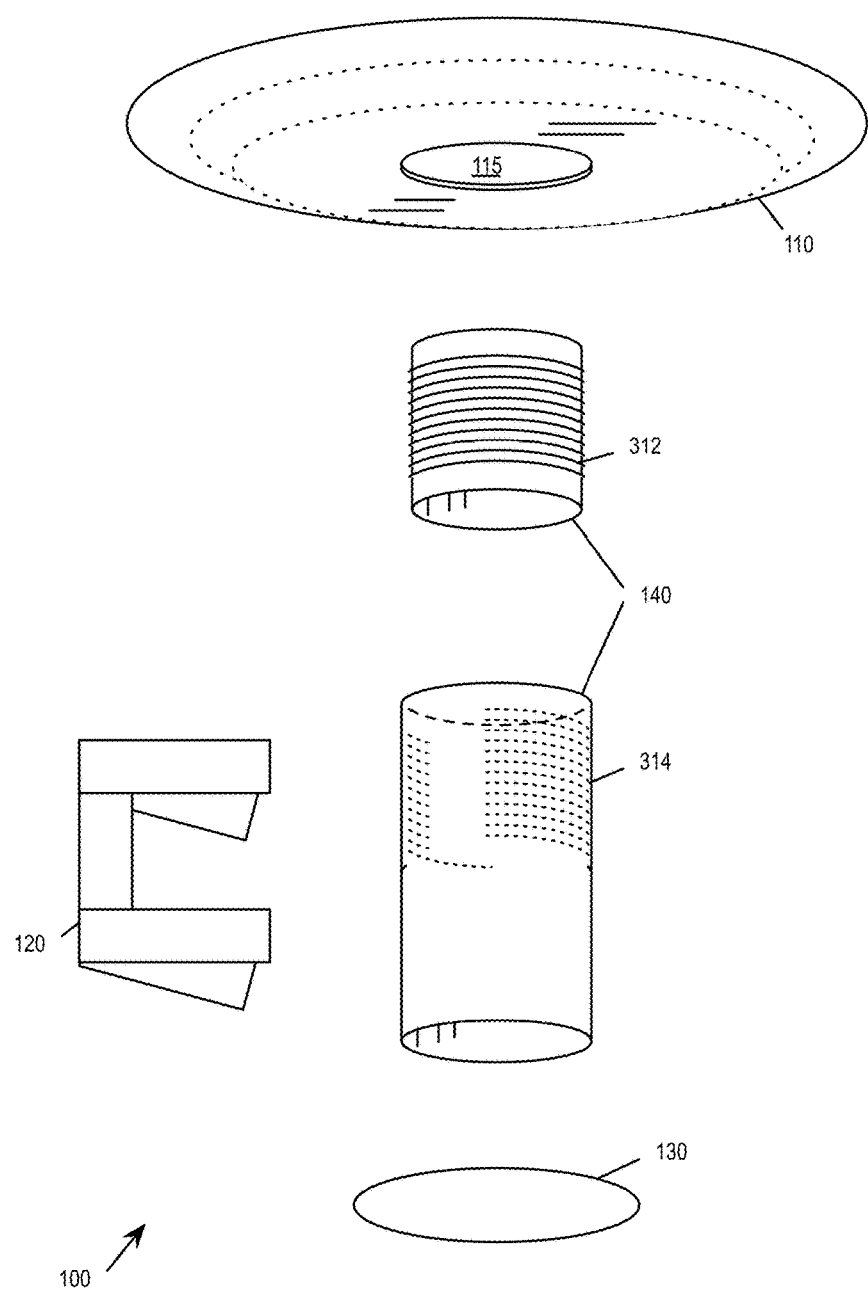
FIG. 6 illustrates various components of the rotational ice cream holder.

FIG. 6 illustrates various components that are assembled to form the rotational ice cream holder 100. The components include the dish 110, the handle 120, the base 130, and the rotator 140 (including the moving component 312 and the stationary component 314). In some embodiments, the base 130 is optional. In some embodiments, the stationary component 314 of the rotator 140 can serve as the handle 120 so a separate handle component for the rotational ice cream holder is not necessary.

The rotational ice cream holder can be constructed with inexpensive material. The dish 110, the handle 120, and the base 130 can be made with paper, light plastic, Styrofoam, or a combination of some or all of these components. The rotator 140 can be made with plastic.

The rotational ice cream holder can be constructed with inexpensive off-the-shelf components. For example, the dish 110 can be a disposable paper plate with a hole cut in the middle. The moving and stationary components 312 and 314 of the rotator 140 can be components of a plastic coupler (such as the threaded male and female pieces of a piping tip coupler for decorating cakes.)

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
    a plate comprising:
        a flat surface area that is substantially larger than a scoop of ice cream; and
        an aperture near a center of the flat surface area of the plate;
    a rotator coupled to the plate; and
    a handle coupled to the rotator,
    wherein the rotator comprises a moving component and a stationary component that can be detached from or mated with the moving component, the moving component of the rotator affixed to the plate and the stationary component of the rotator coupled to the handle,
    wherein the moving component of the rotator has an opening to a cavity and the aperture of the plate is aligned with the opening of the moving component of the rotator,
    wherein and the aperture and the opening are sized to hold an ice cream cone.

2. The apparatus of claim 1, wherein the rotator allows the plate to rotate about the handle.

3. The apparatus of claim 1, wherein moving component and the stationary component are threaded with respect to each other.

4. The apparatus of claim 1, wherein the stationary component of the rotator serves as the handle.

5. The apparatus of claim 1, wherein the rotator comprises a threaded male component and a threaded female component that can be detached from or mated with the threaded male component.

6. The apparatus of claim 1, wherein the plate comprises paper.

7. The apparatus of claim 1, wherein the plate comprises Styrofoam.

8. The apparatus of claim 1, wherein the plate comprises a combination of paper and Styrofoam.

9. The apparatus of claim 1, wherein the plate comprises of plastic.

10. The apparatus of claim 1, wherein the rotator comprises plastic.

11. The apparatus of claim 1, wherein the rotator comprises a piping coupler.

* * * * *